United States Patent
Jung et al.

(10) Patent No.: US 10,908,389 B2
(45) Date of Patent: Feb. 2, 2021

(54) TELESCOPIC OPTICAL IMAGING SYSTEM

(71) Applicant: SAMSUNG ELECTRO-MECHANICS CO., LTD., Suwon-si (KR)

(72) Inventors: Jin Hwa Jung, Suwon-si (KR); Yong Joo Jo, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 192 days.

(21) Appl. No.: 16/129,888

(22) Filed: Sep. 13, 2018

(65) Prior Publication Data
US 2019/0137735 A1     May 9, 2019

(30) Foreign Application Priority Data

Nov. 9, 2017 (KR) .................. 10-2017-0148960
Jan. 22, 2018 (KR) .................. 10-2018-0007785

(51) Int. Cl.
G02B 9/62 (2006.01)
G02B 27/00 (2006.01)
G02B 7/02 (2006.01)
G02B 13/00 (2006.01)

(52) U.S. Cl.
CPC ............ *G02B 9/62* (2013.01); *G02B 7/021* (2013.01); *G02B 13/0045* (2013.01); *G02B 27/0037* (2013.01)

(58) Field of Classification Search
CPC ...... G02B 9/62; G02B 7/021; G02B 13/0045; G02B 27/0037; G02B 13/02; H04M 1/0264

USPC ........................................ 359/642, 708, 713
See application file for complete search history.

(56) References Cited

U.S. PATENT DOCUMENTS

| | | | |
|---|---|---|---|
| 9,904,037 B1 * | 2/2018 | Wang | G02B 13/0045 |
| 2015/0146806 A1 | 5/2015 | Liao | |
| 2016/0187621 A1 | 6/2016 | Chen | |
| 2016/0187622 A1 | 6/2016 | Huang | |
| 2016/0320592 A1 | 11/2016 | Huang | |

(Continued)

FOREIGN PATENT DOCUMENTS

| | | |
|---|---|---|
| CN | 104656229 A | 5/2015 |
| CN | 106371193 A | 2/2017 |

(Continued)

OTHER PUBLICATIONS

Korean Office Action dated Feb. 8, 2019 in corresponding Korean Patent Application No. 10-2018-0007785 (6 pages in English, 5 pages in Korean).

(Continued)

*Primary Examiner* — Tuyen Tra
(74) *Attorney, Agent, or Firm* — NSIP Law

(57) ABSTRACT

An optical imaging system includes a first lens, a second lens, a third lens, a fourth lens, a fifth lens, and a sixth lens sequentially arranged on an optical axis from an object side to an image side, wherein an image-side surface of the first lens and an image-side surface of the sixth lens may be concave, and $0.7<TL/f<1.0$ and $|Nd2-Nd3|<0.2$ in which TL may be a distance from an object-side surface of the first lens to an imaging plane, f may be an overall focal length of the optical imaging system, Nd2 may be a refractive index of the second lens, and Nd3 may be a refractive index of the third lens.

19 Claims, 7 Drawing Sheets

(56) References Cited

U.S. PATENT DOCUMENTS

| | | |
|---|---|---|
| 2017/0023769 A1 | 1/2017 | Jo |
| 2017/0146776 A1 | 5/2017 | Kang et al. |
| 2017/0184815 A1* | 6/2017 | Wang .................. G02B 13/006 |
| 2017/0307849 A1 | 10/2017 | Jhang et al. |
| 2018/0059373 A1 | 3/2018 | Chen et al. |
| 2018/0164550 A1* | 6/2018 | Wang ..................... G02B 5/005 |
| 2018/0172957 A1 | 6/2018 | Lee et al. |
| 2019/0121061 A1 | 4/2019 | Jung et al. |

FOREIGN PATENT DOCUMENTS

| | | |
|---|---|---|
| CN | 106526789 A | 3/2017 |
| KR | 10-1690481 B1 | 12/2016 |
| KR | 10-2017-0059244 A | 5/2017 |
| KR | 10-2018-0071859 A | 6/2018 |
| KR | 10-1946262 B1 | 2/2019 |

OTHER PUBLICATIONS

Chinese Office Action dated Nov. 11, 2020 in counterpart Chinese Patent Application No. 201811328240.9 (9 pages in English, 10 pages in Korean).

\* cited by examiner

TELESCOPIC OPTICAL IMAGING SYSTEM

CROSS-REFERENCE TO RELATED APPLICATIONS

This application claims the benefit under 35 U.S.C. § 119(a) of Korean Patent Application Nos. 10-2017-0148960 and 10-2018-0007785 respectively filed on Nov. 9, 2017 and Jan. 22, 2018 in the Korean Intellectual Property Office, the entire disclosures of which are incorporated herein by reference for all purposes.

BACKGROUND

1. Field

This application relates to a telescopic optical imaging system including six lenses.

2. Description of Related Art

A telescopic optical system that captures images of a subject that is located at a long distance from the telescopic optical system may have a significant size. For example, a ratio (TL/f) of a total length (TL) of the telescopic optical system to an overall focal length (f) of the telescopic optical system may be 1 or more. Therefore, it may be difficult to mount the telescopic optical system in a small electronic device such as a mobile communications terminal, or similar devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an optical imaging system includes a first lens, a second lens, a third lens, a fourth lens, a fifth lens, and a sixth lens sequentially arranged on an optical axis from an object side to an image side, wherein an image-side surface of the first lens and an image-side surface of the sixth lens may be concave, and $0.7<TL/f<1.0$ and $|Nd2-Nd3|<0.2$ in which TL may be a distance from an object-side surface of the first lens to an imaging plane, f may be an overall focal length of the optical imaging system, Nd2 may be a refractive index of the second lens, and Nd3 may be a refractive index of the third lens.

The third lens may include positive refractive power.
The fifth lens may include negative refractive power.
The sixth lens comprises negative refractive power.
An object-side surface of the fourth lens may be concave.
An image-side surface of the fourth lens may be convex.
An object-side surface of the fifth lens may be concave.
An image-side surface of the fifth lens may be convex.
An object-side surface of the sixth lens may be convex.
$0.5<f1/f<1.0$ in which f1 may be a focal length of the first lens.

In a general aspect, an optical imaging system includes a first lens, a second lens, a third lens, a fourth lens, a fifth lens, and a sixth lens sequentially arranged on an optical axis from an object side to an image side, wherein the third lens comprises positive refractive power, and an image-side surface of the sixth lens is concave, and $0.7<TL/f<1.0$ and $|Nd2-Nd3|<0.2$ in which TL is a distance from an object-side surface of the first lens to an imaging plane, f is an overall focal length of the optical imaging system, Nd2 is a refractive index of the second lens, and Nd3 is a refractive index of the third lens.

$-2.0<f2/f<-1.0$ in which f2 may be a focal length of the second lens.
$2.0<f4/f<3.6$ in which f4 may be a focal length of the fourth lens.
$-4.0<f5/f<-1.0$ in which f5 may be a focal length of the fifth lens.
$-4.0<f6/f<-1.0$ in which f6 may be a focal length of the sixth lens.
$-2.0<f4/f5<-1.0$ in which f4 may be a focal length of the fourth lens, and f5 may be a focal length of the fifth lens.

In a general aspect, a multi-module optical imaging system includes a first optical imaging system comprising a first field of view and at least four lens, and a second optical imaging system including a first lens, a second lens, a third lens, a fourth lens, a fifth lens, and a sixth lens, the second optical imaging system comprising a second field of view different from the first field of view, wherein for the second optical imaging system, $0.7<TL/f<1.0$ and $|Nd2-Nd3|<0.2$ in which TL may be a distance from an object-side surface of the first lens to an imaging plane, f may be an overall focal length of the second optical imaging system, Nd2 may be a refractive index of the second lens, and Nd3 may be a refractive index of the third lens.

The first lens and the sixth lens of the second optical imaging system may each include a concave image side surface and negative refractive power.

The first field may be 50% or more and the second field of view may be 50% or less.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
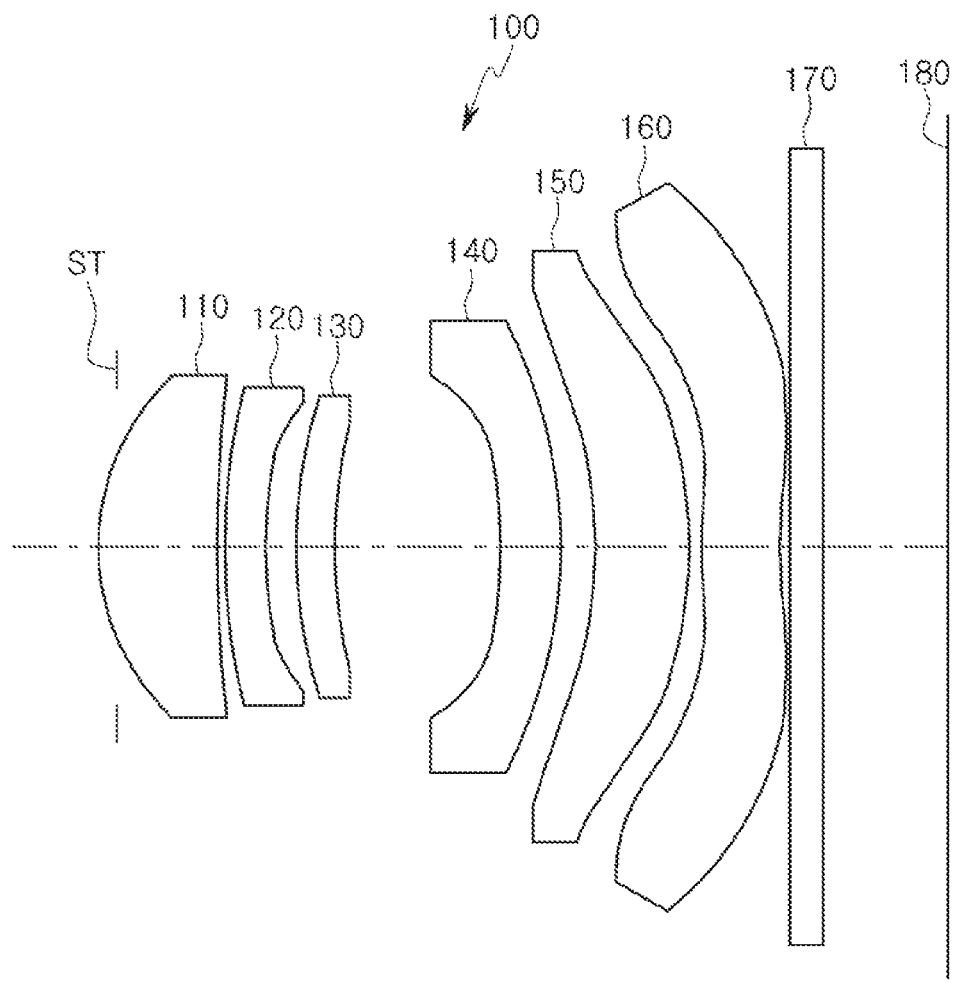
FIG. 1 is a view illustrating an example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The various examples herein may provide an optical imaging system that is mounted in a small terminal, and captures an image of a subject at a long distance.

It is noted that use of the term "may" herein with respect to an example or embodiment, e.g., as to what an example or embodiment may include or implement, means that at least one example or embodiment exists where such a feature is included or implemented while all examples and embodiments are not limited thereto.

In the examples described herein, a first lens may refer to a lens closest to an object (or a subject), while a sixth lens may refer to a lens closest to an imaging plane (or an image sensor). Additionally, the radii of curvature and thicknesses of lenses, a TL, an IMG HT (a half of a diagonal length of the imaging plane), and focal lengths of the lenses are represented by millimeters (mm).

Further, thicknesses of the lenses, gaps between the lenses, and the TL are distances calculated on the basis of optical axes of the lenses. Further, when the shapes of the lenses is being described, an indication that one surface of a lens is convex may mean that an optical axis portion of a corresponding surface of the lens is convex. Similarly, an indication that one surface of a lens is concave may mean that an optical axis portion of a corresponding surface the lens is concave. Therefore, although various examples may indicate that one surface of a lens is convex, an edge portion of the same lens may be concave. Similarly, although various examples may indicate that one surface of a lens is concave, an edge portion of the same lens may be convex.

In an example, optical imaging system may include six lenses, but is not limited to six lenses. For example, the optical imaging system may include a first lens, a second lens, a third lens, a fourth lens, a fifth lens, and a sixth lens that are sequentially arranged in order from an object side. The first to sixth lenses may be arranged with an air interval therebetween each of the lenses. For example, an object-side surface of any lens may not be in contact with an image-side surface of a lens neighboring the lens, and an image-side surface of any lens may not be in contact with an object-side surface of a lens neighboring the lens.

In an example, the first lens may have refractive power. For example, the first lens may have positive refractive power. One surface of the first lens may be concave. For example, an image-side surface of the first lens may be concave.

In an example, the first lens may have an aspherical surface. For example, both surfaces of the first lens may be aspherical. The first lens may be formed of a material having high light transmissivity and excellent workability. For example, the first lens may be formed of plastic. However, a material of the first lens is not limited to the plastic. For example, the first lens may be formed of glass. The first lens may have a small refractive index. For example, the refractive index of the first lens may be less than 1.6.

In an example, the second lens may have refractive power. For example, the second lens may have negative refractive power. One surface of the second lens may be convex. For example, an object-side surface of the second lens may be convex.

In an example, the second lens may have an aspherical surface. For example, both surfaces of the second lens may be aspherical. The second lens may be formed of a material having high light transmissivity and excellent workability. For example, the second lens may be formed of plastic. However, a material of the second lens is not limited to the plastic. For example, the second lens may also be formed of glass. The second lens may have a refractive index greater than that of the first lens. For example, the refractive index of the second lens may be 1.63 or more.

In an example, the third lens may have refractive power. For example, the third lens may have positive or negative refractive power. One surface of the third lens may be convex. For example, an object-side surface of the third lens may be convex.

In an example, the third lens may have an aspherical surface. For example, both surfaces of the third lens may be aspherical. The third lens may be formed of a material having high light transmissivity and excellent workability. For example, the third lens may be formed of plastic. However, a material of the third lens is not limited to the plastic. For example, the third lens may be formed of glass. The third lens may have a refractive index that is substantially the same as that of the first lens. For example, the refractive index of the third lens may be less than 1.6.

In an example, the fourth lens may have refractive power. For example, the fourth lens may have positive refractive power. One surface of the fourth lens may be convex. For example, an image-side surface of the fourth lens may be convex.

In an example, the fourth lens may have an aspherical surface. For example, both surfaces of the fourth lens may be aspherical. The fourth lens may be formed of a material having high light transmissivity and excellent workability. For example, the fourth lens may be formed of plastic. However, a material of the fourth lens is not limited to the plastic. For example, the fourth lens may be formed of glass. The fourth lens may have a refractive index greater than that of the first lens. For example, the refractive index of the fourth lens may be 1.63 or more.

In an example, the fifth lens may have refractive power. For example, the fifth lens may have negative refractive power. One surface of the fifth lens may be convex. For example, an image-side surface of the fifth lens may be convex.

In an example, the fifth lens may have an aspherical surface. For example, both surfaces of the fifth lens may be aspherical. The fifth lens may be formed of a material having high light transmissivity and excellent workability. For example, the fifth lens may be formed of plastic. However, a material of the fifth lens is not limited to the plastic. For example, the fifth lens may be formed of glass. The fifth lens may have a predetermined refractive index. For example, the refractive index of the fifth lens may be 1.5 or more.

In an example, the sixth lens may have refractive power. For example, the sixth lens may have negative refractive power. One surface of the sixth lens may be concave. For example, an image-side surface of the sixth lens may be concave.

In an example, the sixth lens may have an aspherical surface. For example, both surfaces of the sixth lens may be aspherical. The sixth lens may be formed of a material having high light transmissivity and excellent workability. For example, the sixth lens may be formed of plastic. However, a material of the sixth lens is not limited to the plastic. For example, the sixth lens may be formed of glass. The sixth lens may have a refractive index smaller than that of the first lens. For example, the refractive index of the sixth lens may be less than 1.54.

The aspherical surfaces of the first to sixth lenses may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}. \quad \text{Equation 1}$$

In Equation 1, c is an inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance r and a tangential plane meeting the apex of the aspherical surface of the lens.

The optical imaging system may further include a filter, an image sensor, and a stop.

The filter may be disposed between the sixth lens and the image sensor. The filter may block some wavelengths of light. For example, the filter may block an infrared wavelength of light.

The image sensor may form the imaging plane. For example, a surface of the image sensor may form the imaging plane.

The stop may be disposed in order to control an amount of light incident to the lenses. For example, the stop may be disposed in front of the first lens or between the first and second lenses.

In the examples disclosed herein, the optical imaging system may satisfy one or more of the following Conditional Expressions (1) to (10):

$$0.7 < TL/f < 1.0 \quad (1)$$

$$|Nd2 - Nd3| < 0.2 \quad (2)$$

$$0.5 < f1/f < 1.0 \quad (3)$$

$$-2.0 < f2/f < -1.0 \quad (4)$$

$$|f3/f| < 20 \quad (5)$$

$$2.0 < f4/f < 3.6 \quad (6)$$

$$-4.0 < f5/f < -1.0 \quad (7)$$

$$-4.0 < f6/f < -1.0 \quad (8)$$

$$-2.0 < f4/f5 < -1.0 \quad (9)$$

$$2.0 < D56/D6F < 5.0. \quad (10)$$

In the Conditional Expressions (1) to (10), TL is a distance from an object-side surface of the first lens to the imaging plane, f is an overall focal length of the optical imaging system, Nd2 is a refractive index of the second lens, Nd3 is a refractive index of the third lens, f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, D56 is a distance from an object-side surface of the fifth lens to an object-side surface of the sixth lens, and D6F is a distance from the image-side surface of the sixth lens to the filter.

The optical imaging system may additionally satisfy the following Conditional Expression:

$$3.0<|f3/f|<10. \quad (11)$$

Conditional Expression 1 may be a condition for miniaturizing the optical imaging system. For example, when TL/f is out of an upper limit value of Conditional Expression 1, it may be difficult to miniaturize the optical imaging system. Accordingly, it may be difficult to mount the optical imaging system in a mobile communications terminal, and when TL/f is out of a lower limit value of Conditional Expression 1, it may be difficult to manufacture the optical imaging system.

Conditional Expression 2 may be a relational expression for a material of the second lens and a material of the third lens. The optical imaging system satisfying Conditional Expression 2 may be advantageous for correction of chromatic aberration through the second lens and the third lens.

Conditional Expression 3 may be a conditional expression for increasing an aberration correction effect through the third lens. For example, when f1/f is out of an upper limit value of Conditional Expression 3, the third lens may have low reflective power, such that the aberration correction effect is slight.

Next, optical imaging systems according to various examples will be described.

An optical imaging system according to a first example will be described with reference to FIG. 1.

The optical imaging system 100 according to the first example may include a first lens 110, a second lens 120, a third lens 130, a fourth lens 140, a fifth lens 150, and a sixth lens 160.

The first lens 110 may have positive refractive power, and an object-side surface thereof may be convex and an image-side surface thereof may be concave. The second lens 120 may have negative refractive power, and an object-side surface thereof may be convex and an image-side surface thereof may be concave. The third lens 130 may have positive refractive power, and an object-side surface thereof may be convex and an image-side surface thereof may be concave. The fourth lens 140 may have positive refractive power, and an object-side surface thereof may be concave and an image-side surface thereof may be convex. The fifth lens 150 may have negative refractive power, and an object-side surface thereof may be concave and an image-side surface thereof may be convex. The sixth lens 160 may have negative refractive power, and an object-side surface thereof may be convex and an image-side surface thereof may be concave. In addition, inflection points may be formed on the object-side surface and the image-side surface of the sixth lens 160.

The optical imaging system 100 may further include a filter 170, an image sensor 180, and a stop ST. The filter 170 may be disposed between the sixth lens 160 and the image sensor 180, and the stop ST may be disposed on the object-side surface of the first lens 110.

Figure 2:
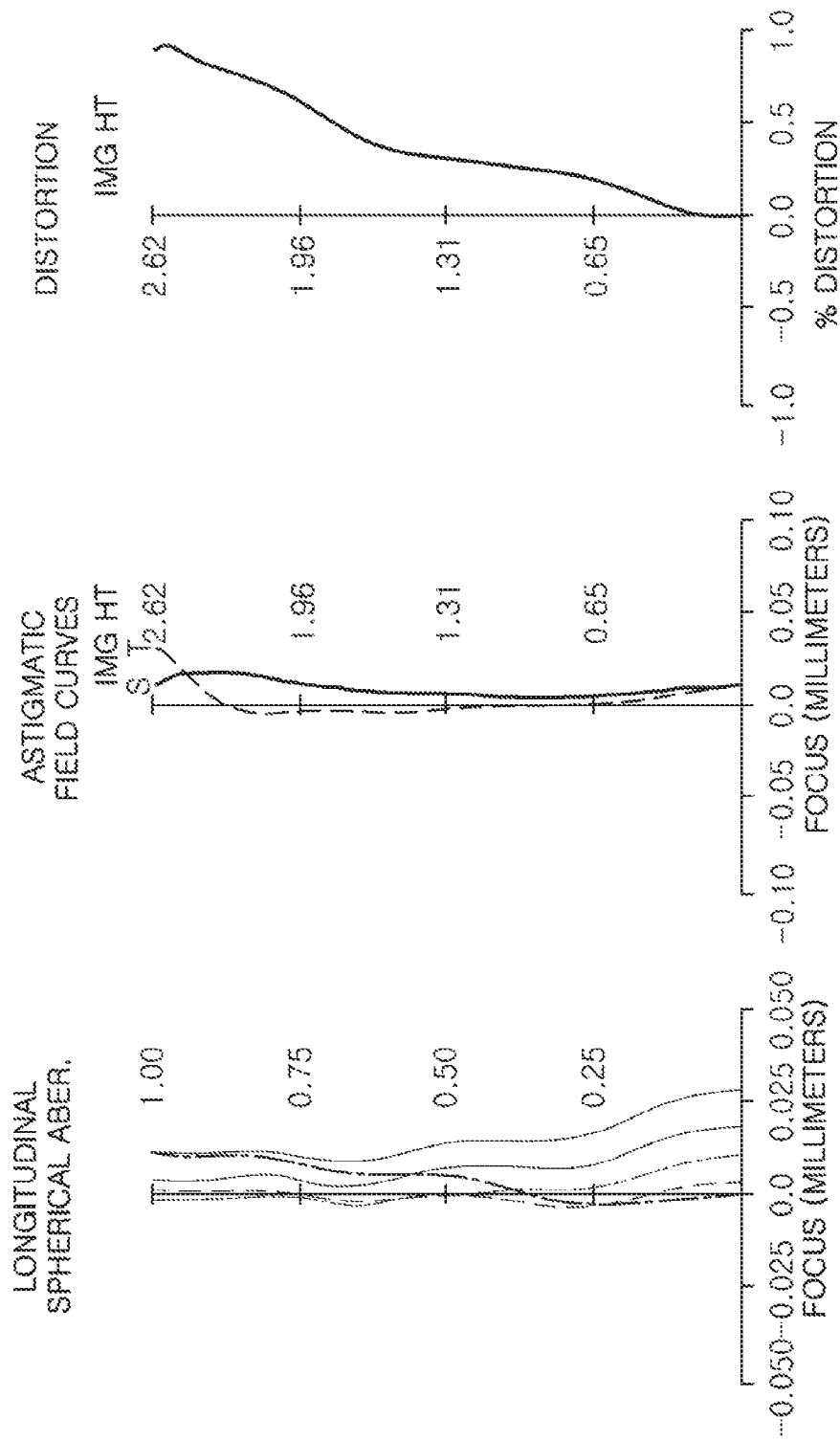
FIG. 2 illustrates examples of graphs representing aberration curves of the optical imaging system illustrated in the example of FIG. 1.

The optical imaging system configured as described above may represent aberration characteristics as illustrated in FIG. 2. Characteristics of lenses and aspherical values of the optical imaging system according to the first example are represented by Tables 1 and 2.

TABLE 1

First Example
f = 5.20 IMG HT = 2.62 TL = 5.090

| Surface No. | | Radius of Curvature | Thickness/ Distance | Focal Length | Refractive Index | Abbe Number |
|---|---|---|---|---|---|---|
| S1 | First Lens | 1.4220 | 0.7250 | 3.281 | 1.544 | 56.00 |
| S2 | | 5.6260 | 0.0500 | | | |
| S3 | Second Lens | 5.1680 | 0.2300 | −6.847 | 1.650 | 21.50 |
| S4 | | 2.3630 | 0.1850 | | | |
| S5 | Third Lens | 1.9300 | 0.2340 | 20.863 | 1.544 | 56.00 |
| S6 | | 2.2190 | 0.9850 | | | |
| S7 | Fourth Lens | −5.1820 | 0.3500 | 18.265 | 1.650 | 21.50 |
| S8 | | −3.7170 | 0.2200 | | | |
| S9 | Fifth Lens | −2.0190 | 0.5630 | −12.050 | 1.650 | 21.50 |
| S10 | | −3.0100 | 0.1000 | | | |
| S11 | Sixth Lens | 8.0450 | 0.4500 | −8.826 | 1.516 | 55.65 |
| S12 | | 2.9230 | 0.0460 | | | |
| S13 | Filter | infinity | 0.2100 | | 1.519 | 64.20 |
| S14 | | infinity | 0.7510 | | | |
| S15 | Imaging Plane | infinity | −0.0100 | | | |

TABLE 2

| First Example | S1 | S2 | S3 | S4 | S5 | S6 | S7 | S8 | S9 | S10 | S11 | S12 |
|---|---|---|---|---|---|---|---|---|---|---|---|---|
| Radius of Curvature | 1.422 | 5.626 | 5.168 | 2.363 | 1.927 | 2.219 | −5.182 | −3.717 | −2.019 | −3.010 | 8.045 | 2.923 |
| K | −0.187 | −12.289 | 4.423 | 4.708 | −11.724 | −22.915 | 22.543 | −23.337 | −13.490 | −12.622 | 12.405 | 0.223 |
| A | 0.008 | −0.173 | −0.242 | −0.228 | −0.071 | 0.101 | −0.066 | −0.048 | −0.101 | −0.162 | −0.378 | −0.252 |
| B | −0.007 | 0.491 | 0.792 | 0.706 | −0.039 | −0.526 | −0.204 | −0.129 | 0.077 | 0.151 | 0.304 | 0.151 |
| C | 0.023 | −0.917 | −1.392 | −1.389 | 0.197 | 1.197 | 0.332 | 0.236 | 0.002 | −0.090 | −0.156 | −0.075 |
| D | −0.029 | 1.130 | 1.612 | 2.204 | −0.464 | −2.056 | −0.495 | −0.223 | −0.03 | 0.028 | 0.049 | 0.03 |
| E | 0.009 | −0.858 | −1.054 | −2.412 | 0.744 | 2.361 | 0.374 | 0.132 | 0.017 | −0.004 | −0.009 | −0.006 |
| F | 0.007 | 0.354 | 0.312 | 1.746 | −0.543 | −1.533 | −0.132 | −0.042 | −0.004 | 0.000 | 0.001 | 0.001 |
| G | −0.006 | −0.062 | −0.018 | −0.597 | 0.139 | 0.403 | 0.000 | 0.005 | 0.000 | 0.000 | 0.000 | 0.000 |
| H | 0.000 | 0.000 | 0.000 | 0.000 | 0.000 | 0.000 | 0.000 | 0.000 | 0.000 | 0.000 | 0.000 | 0.000 |
| J | 0.000 | 0.000 | 0.000 | 0.000 | 0.000 | 0.000 | 0.000 | 0.000 | 0.000 | 0.000 | 0.000 | 0.000 |

Figure 3:
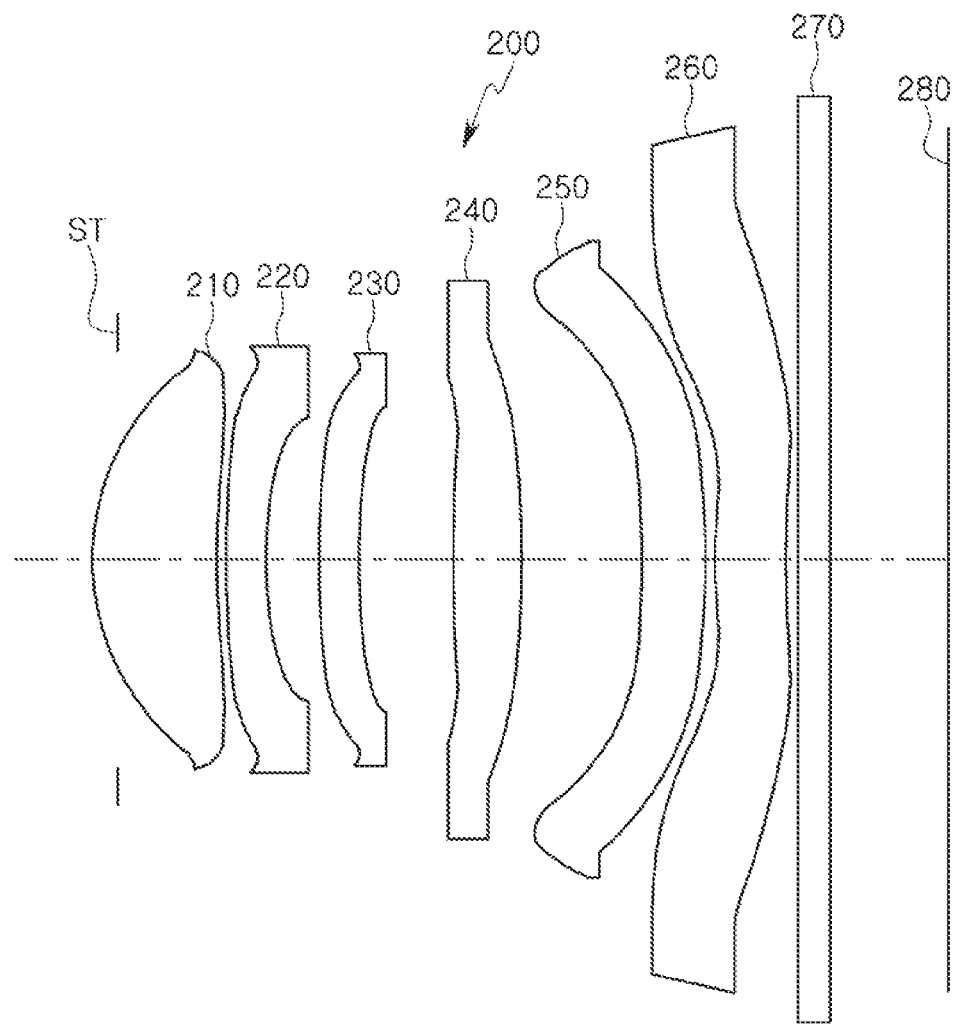
FIG. 3 is a view illustrating an example of an optical imaging system.

An optical imaging system according to a second example will be described with reference to FIG. 3.

The optical imaging system 200 according to the second example may include a first lens 210, a second lens 220, a third lens 230, a fourth lens 240, a fifth lens 250, and a sixth lens 260.

The first lens 210 may have positive refractive power, and an object-side surface thereof may be convex and an image-side surface thereof may be concave. The second lens 220 may have negative refractive power, and an object-side surface thereof may be convex and an image-side surface thereof may be concave. The third lens 230 may have negative refractive power, and an object-side surface thereof may be convex and an image-side surface thereof may be concave. The fourth lens 240 may have positive refractive power, and an object-side surface thereof may be convex and an image-side surface thereof may be convex. The fifth lens 250 may have negative refractive power, and an object-side surface thereof may be concave and an image-side surface thereof may be convex. The sixth lens 260 may have negative refractive power, and an object-side surface thereof may be convex and an image-side surface thereof may be concave. In addition, inflection points may be formed on the object-side surface and the image-side surface of the sixth lens 260.

The optical imaging system 200 may further include a filter 270, an image sensor 280, and a stop ST. The filter 270 may be disposed between the sixth lens 260 and the image sensor 280, and the stop ST may be disposed on the object-side surface of the first lens 210.

Figure 4:
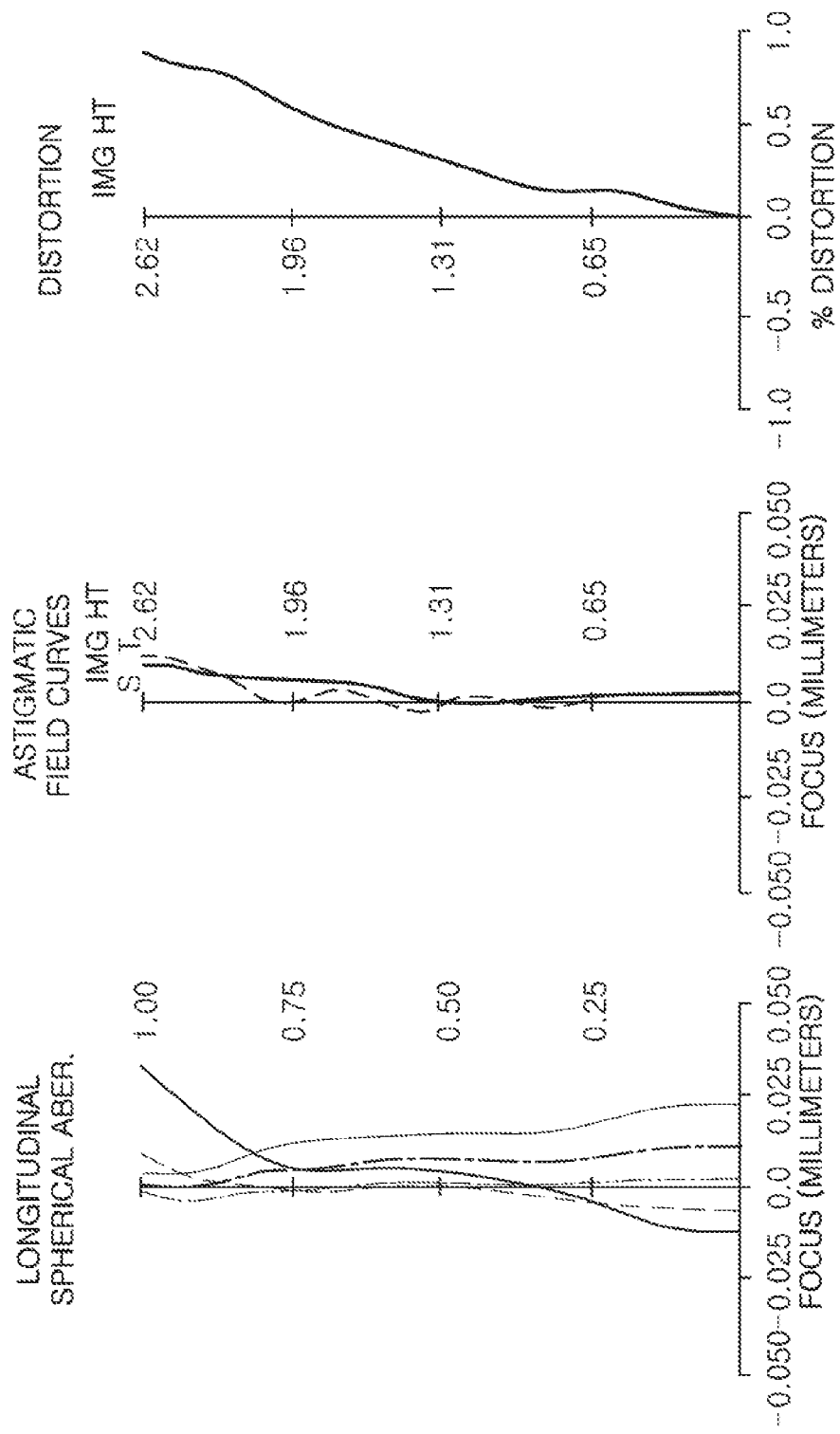
FIG. 4 illustrates examples of graphs representing aberration curves of the optical imaging system illustrated in the example of FIG. 3.

The optical imaging system configured as described above may represent aberration characteristics as illustrated in FIG. 4. Characteristics of lenses and aspherical values of the optical imaging system according to the second example are represented by Tables 3 and 4.

TABLE 3

Second Example
f = 5.20 IMG HT = 2.62 TL = 5.090

| Surface No. | | Radius of Curvature | Thickness/ Distance | Focal Length | Refractive Index | Abbe Number |
|---|---|---|---|---|---|---|
| S1 | First Lens | 1.4110 | 0.7550 | 2.929 | 1.544 | 56.00 |
| S2 | | 9.6320 | 0.0500 | | | |
| S3 | Second Lens | 8.2180 | 0.2300 | −5.713 | 1.650 | 21.50 |
| S4 | | 2.5490 | 0.3270 | | | |
| S5 | Third Lens | 4.1800 | 0.2300 | −22.725 | 1.544 | 56.00 |
| S6 | | 3.0680 | 0.5880 | | | |
| S7 | Fourth Lens | 13.7000 | 0.3500 | 11.470 | 1.650 | 21.50 |
| S8 | | −16.6060 | 0.7470 | | | |
| S9 | Fifth Lens | −5.0390 | 0.3500 | −10.503 | 1.650 | 21.50 |
| S10 | | −19.1710 | 0.1000 | | | |
| S11 | Sixth Lens | 7.6300 | 0.4200 | −10.541 | 1.516 | 55.65 |
| S12 | | 3.1860 | 0.0400 | | | |
| S13 | Filter | infinity | 0.2100 | | 1.517 | 64.20 |
| S14 | | infinity | 0.6950 | | | |
| S15 | Imaging Plane | infinity | −0.0020 | | | |

Figure 5:
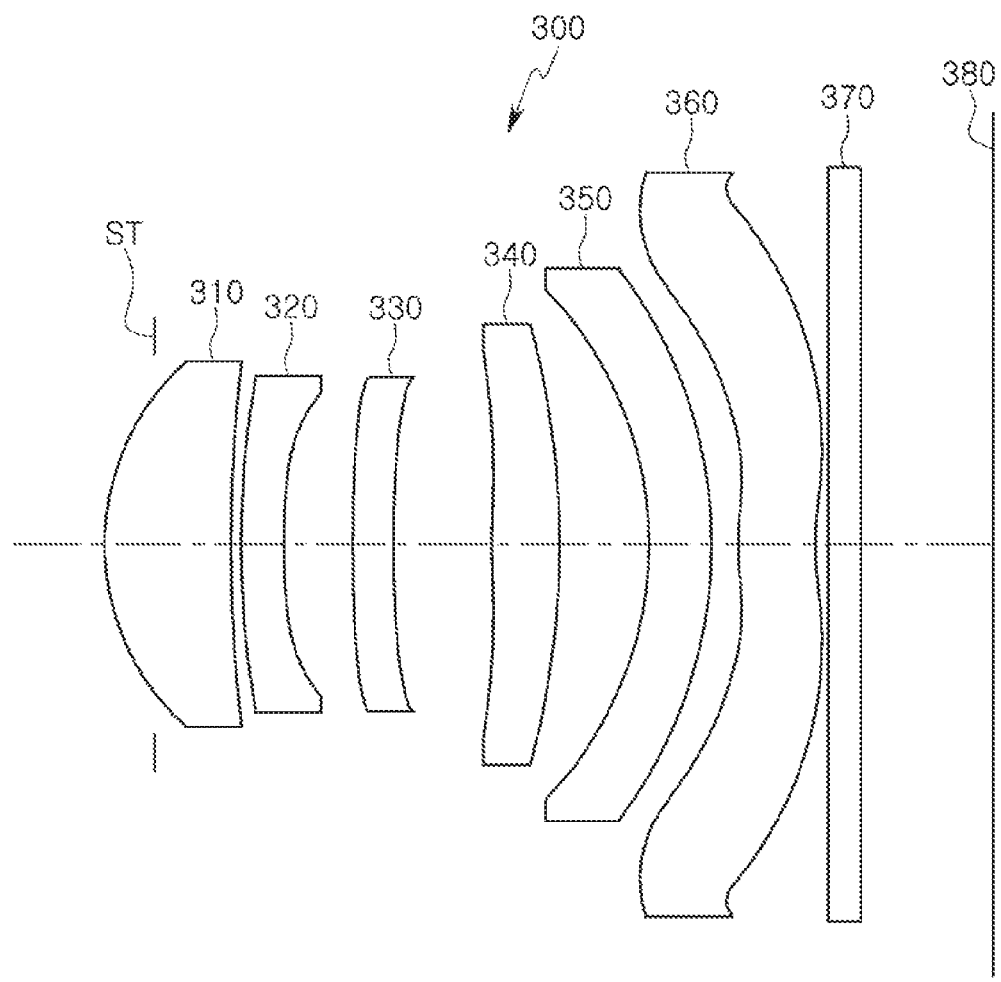
FIG. 5 is a view illustrating an example of an optical imaging system.

An optical imaging system according to a third example will be described with reference to FIG. 5.

The optical imaging system 300 according to the third example may include a first lens 310, a second lens 320, a third lens 330, a fourth lens 340, a fifth lens 350, and a sixth lens 360.

The first lens 310 may have positive refractive power, and an object-side surface thereof may be convex and an image-side surface thereof may be concave. The second lens 320 may have negative refractive power, and an object-side surface thereof may be convex and an image-side surface thereof may be concave. The third lens 330 may have negative refractive power, and an object-side surface thereof may be convex and an image-side surface thereof may be concave. The fourth lens 340 may have positive refractive power, and an object-side surface thereof may be convex and an image-side surface thereof may be convex. The fifth lens 350 may have negative refractive power, and an object-side surface thereof may be concave and an image-side surface thereof may be convex. The sixth lens 360 may have negative refractive power, and an object-side surface thereof may be convex and an image-side surface thereof may be concave. In addition, inflection points may be formed on the object-side surface and the image-side surface of the sixth lens 360.

The optical imaging system 300 may further include a filter 370, an image sensor 380, and a stop ST. The filter 370 may be disposed between the sixth lens 360 and the image sensor 380, and the stop ST may be disposed on the object-side surface of the first lens 310.

Figure 6:
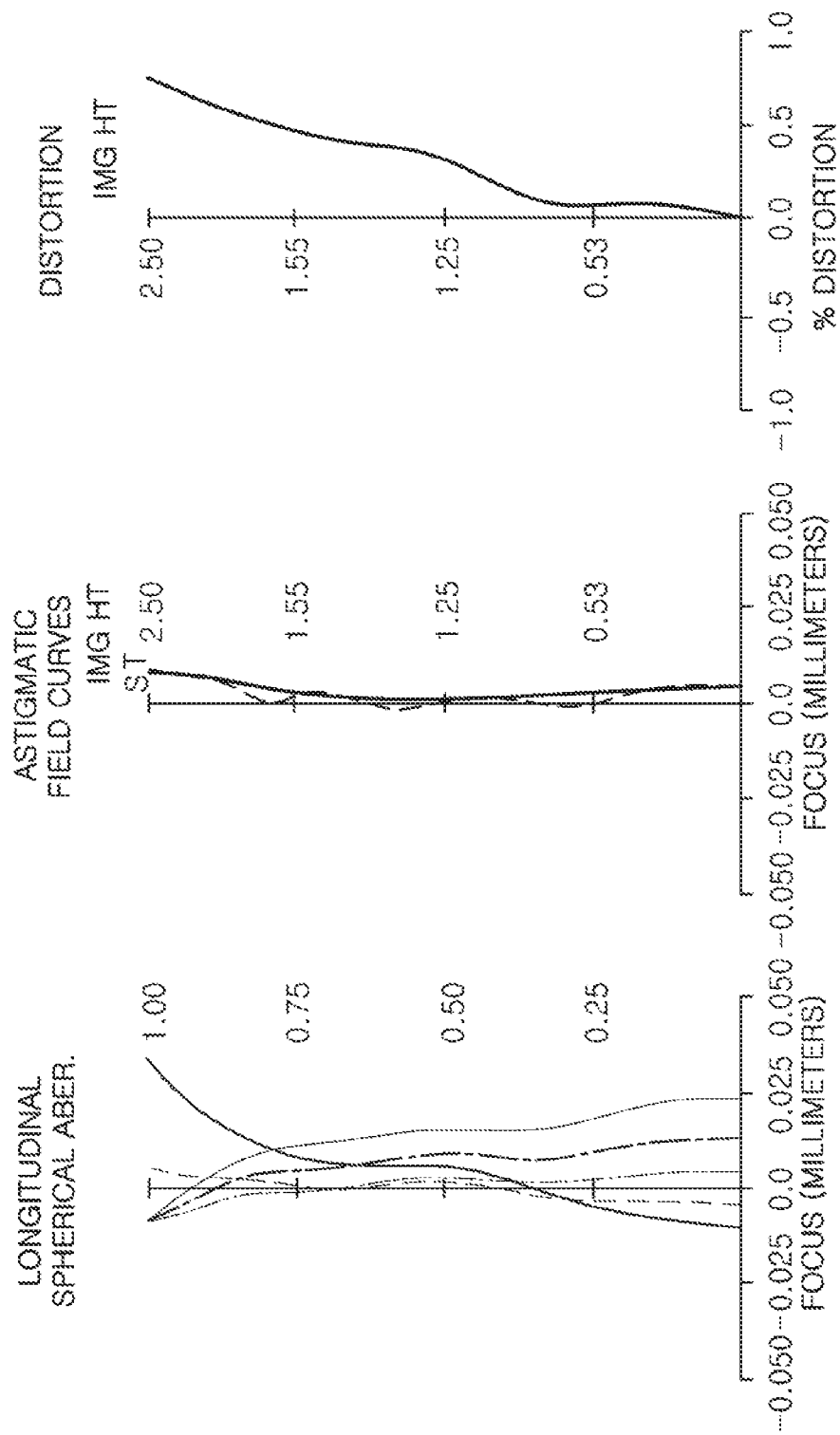
FIG. 6 illustrates examples of graphs representing aberration curves of the optical imaging system illustrated in the example of FIG. 5.

The optical imaging system configured as described in the third example may represent aberration characteristics as illustrated in FIG. 6. Characteristics of lenses and aspherical values of the optical imaging system according to the third example are represented by Tables 5 and 6.

TABLE 5

Third Example
f = 5.20 IMG HT = 2.50 TL = 5.090

| Surface No. | | Radius of Curvature | Thickness/ Distance | Focal Length | Refractive Index | Abbe Number |
|---|---|---|---|---|---|---|
| S1 | First Lens | 1.4430 | 0.7360 | 2.976 | 1.544 | 56.00 |
| S2 | | 10.4940 | 0.0500 | | | |
| S3 | Second Lens | 9.6800 | 0.2300 | −5.971 | 1.650 | 21.50 |
| S4 | | 2.7660 | 0.3930 | | | |
| S5 | Third Lens | 5.1260 | 0.2300 | −45.130 | 1.650 | 21.50 |
| S6 | | 4.2930 | 0.6030 | | | |
| S7 | Fourth Lens | 13.2040 | 0.3500 | 13.908 | 1.650 | 21.50 |
| S8 | | −29.4150 | 0.5010 | | | |

TABLE 4

| Second Example | S1 | S2 | S3 | S4 | S5 | S6 | S7 | S8 | S9 | S10 | S11 | S12 |
|---|---|---|---|---|---|---|---|---|---|---|---|---|
| Radius of Curvature | 1.411 | 9.632 | 8.218 | 2.549 | 4.183 | 4.183 | 13.697 | −16.606 | −5.039 | −19.171 | 7.630 | 3.186 |
| K | −0.181 | 0.501 | 22.622 | 5.366 | −0.949 | −0.949 | 95.868 | −23.337 | −7.429 | 61.416 | 8.234 | 0.596 |
| A | 0.009 | −0.225 | −0.319 | −0.215 | −0.306 | −0.306 | −0.085 | −0.042 | 0.067 | −0.056 | −0.446 | −0.329 |
| B | 0.002 | 0.919 | 1.386 | 0.864 | 0.452 | 0.452 | −0.071 | −0.103 | −0.263 | −0.058 | 0.373 | 0.268 |
| C | −0.003 | −1.919 | −2.922 | −1.810 | −0.225 | −0.225 | 0.154 | 0.172 | 0.274 | 0.087 | −0.166 | −0.157 |
| D | 0.032 | 2.344 | 3.785 | 2.868 | 0.015 | 0.015 | −0.130 | −0.149 | −0.19 | −0.058 | 0.043 | 0.06 |
| E | −0.065 | −1.753 | −2.975 | −2.943 | 0.246 | 0.246 | 0.066 | 0.081 | 0.076 | 0.019 | −0.006 | −0.016 |
| F | 0.055 | 0.749 | 1.321 | 2.011 | −0.233 | −0.233 | −0.015 | −0.024 | −0.014 | −0.003 | 0.000 | 0.002 |
| G | −0.020 | −0.144 | −0.255 | −0.615 | 0.054 | 0.054 | 0.000 | 0.003 | 0.001 | 0.000 | 0.000 | 0.000 |
| H | 0.000 | 0.000 | 0.000 | 0.000 | 0.000 | 0.000 | 0.000 | 0.000 | 0.000 | 0.000 | 0.000 | 0.000 |
| J | 0.000 | 0.000 | 0.000 | 0.000 | 0.000 | 0.000 | 0.000 | 0.000 | 0.000 | 0.000 | 0.000 | 0.000 |

TABLE 5-continued

Third Example
f = 5.20 IMG HT = 2.50 TL = 5.090

| Surface No. | | Radius of Curvature | Thickness/ Distance | Focal Length | Refractive Index | Abbe Number |
|---|---|---|---|---|---|---|
| S9 | Fifth Lens | −5.6820 | 0.3500 | −12.736 | 1.544 | 56.00 |
| S10 | | −31.6140 | 0.2120 | | | |
| S11 | Sixth Lens | 9.2770 | 0.4200 | −8.623 | 1.516 | 55.65 |
| S12 | | 3.0380 | 0.0470 | | | |
| S13 | Filter | infinity | 0.2100 | | 1.517 | 64.20 |
| S14 | | infinity | 0.7620 | | | |
| S15 | Imaging Plane | infinity | −0.0040 | | | |

TABLE 6

| Third Example | S1 | S2 | S3 | S4 | S5 | S6 | S7 | S8 | S9 | S10 | S11 | S12 |
|---|---|---|---|---|---|---|---|---|---|---|---|---|
| Radius of Curvature | 1.443 | 10.494 | 10.494 | 10.494 | 10.494 | 4.293 | 13.204 | −29.415 | −29.415 | −31.614 | 9.277 | 3.038 |
| K | −0.172 | 44.353 | 44.353 | 44.353 | 44.353 | −2.751 | 87.149 | −23.337 | −23.337 | −99.000 | 6.226 | 0.890 |
| A | 0.008 | −0.147 | −0.147 | −0.147 | −0.147 | −0.195 | −0.099 | −0.050 | −0.050 | 0.016 | −0.327 | −0.319 |
| B | 0.004 | 0.673 | 0.673 | 0.673 | 0.673 | 0.265 | −0.063 | −0.134 | −0.134 | −0.216 | 0.234 | 0.249 |
| C | −0.011 | −1.487 | −1.487 | −1.487 | −1.487 | −0.007 | 0.143 | 0.245 | 0.245 | 0.262 | −0.132 | −0.161 |
| D | 0.057 | 1.957 | 1.957 | 1.957 | 1.957 | −0.164 | −0.110 | −0.232 | −0.23 | −0.179 | 0.049 | 0.07 |
| E | −0.105 | −1.617 | −1.617 | −1.617 | −1.617 | 0.374 | 0.054 | 0.138 | 0.138 | 0.067 | −0.010 | −0.019 |
| F | 0.086 | 0.762 | 0.762 | 0.762 | 0.762 | −0.310 | −0.013 | −0.044 | −0.044 | −0.013 | 0.001 | 0.003 |
| G | −0.029 | −0.159 | −0.159 | −0.159 | −0.159 | 0.079 | 0.000 | 0.006 | 0.006 | 0.001 | 0.000 | 0.000 |
| H | 0.000 | 0.000 | 0.000 | 0.000 | 0.000 | 0.000 | 0.000 | 0.000 | 0.000 | 0.000 | 0.000 | 0.000 |
| J | 0.000 | 0.000 | 0.000 | 0.000 | 0.000 | 0.000 | 0.000 | 0.000 | 0.000 | 0.000 | 0.000 | 0.000 |

Table 7 represents values of Conditional Expressions of the optical imaging systems according to the first to third examples.

TABLE 7

| Conditional Expression | First Example | Second Example | Third Example |
|---|---|---|---|
| TL/F | 0.979 | 0.979 | 0.979 |
| \|ND2 − ND3\| | 0.106 | 0.106 | 0 |
| f1/f | 0.631 | 0.563 | 0.572 |
| f2/f | −1.317 | −1.099 | −1.148 |
| f3/f | 4.012 | −4.370 | −8.679 |
| f4/f | 3.513 | 2.206 | 2.675 |
| f5/f | −2.317 | −2.020 | −2.449 |
| f6/f | −1.697 | −2.027 | −1.658 |
| f4/f5 | −1.516 | −1.092 | −1.092 |
| D56/D6F | 2.174 | 2.500 | 4.511 |

Figure 7:
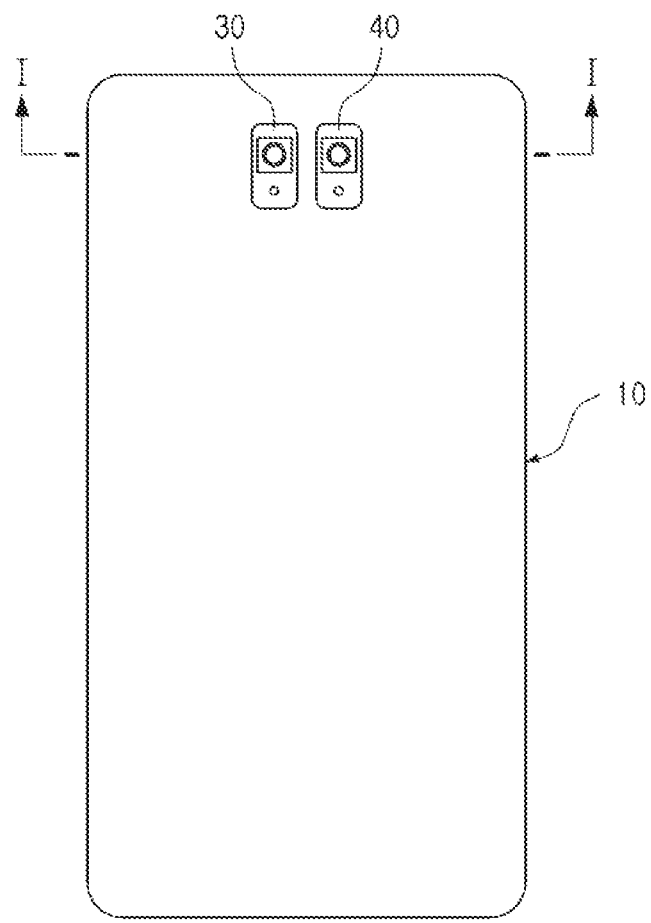
FIG. 7 is a rear view illustrating an example of a mobile communications terminal in which an optical imaging system is mounted.
Figure 8:
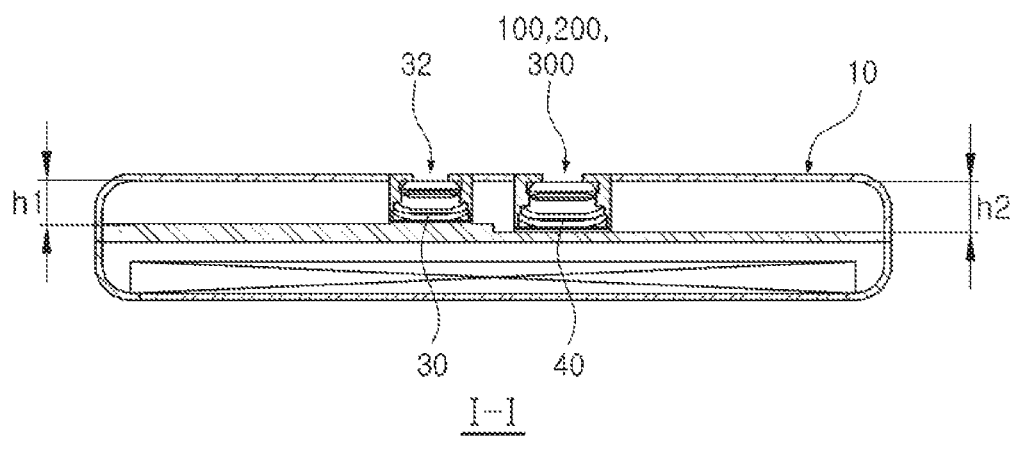
FIG. 8 is an example of a cross-sectional view illustrating the mobile communications terminal illustrated in the example of FIG. 7.

Next, a mobile communications terminal in which an optical imaging system according to an example may be mounted will be described with reference to FIGS. 7 and 8.

A multi-module mobile communications terminal 10 may include a plurality of camera modules 30 and 40. A first camera module 30 may include a first optical imaging system 32 configured to capture an image of a subject positioned at a short distance, and a second camera module 40 may include a second optical imaging system 100, 200, or 300 configured to capture an image of a subject positioned at a long distance.

The first optical imaging system 32 may include a plurality of lenses. For example, the first optical imaging system 32 may include four or more lenses. This is only an example, and the imaging system may include less than four lenses. The first optical imaging system 32 may be configured to capture an image of objects positioned at a short distance at a time. For example, the first optical imaging system 32 may have a wide field of view of 50° or more, and a ratio (h1/Cf) of the first optical system may be 1.0 or more. In an example, h1 is a total length of the first optical imaging system, and Cf may be an overall focal length of the first optical imaging system.

The second optical imaging system 100, 200, or 300 may include a plurality of lenses. For example, the second optical imaging system 100, 200, or 300 may include six lenses. The second optical imaging system 100, 200, or 300 may be any one of the optical imaging systems according to the first to third examples described above. The second optical imaging system 100, 200, or 300 may be configured to capture an image of an object positioned at a long distance. For example, the second optical imaging system 100, 200, or 300 may have a field of view of 50° or less, and a ratio (h2/f) of the second optical imaging system may be less than 1.0.

As set forth above, according to various examples, an optical imaging system which captures an image of a subject at a long distance and is mounted in a small terminal may be implemented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, a third lens, a fourth lens, a fifth lens, and a sixth lens sequentially arranged on an optical axis from an object side to an image side,
wherein an image-side surface of the first lens and an image-side surface of the sixth lens are concave, and
$0.7 < TL/f < 1.0$ and $|Nd2−Nd3| < 0.2$ in which TL is a distance from an object-side surface of the first lens to an imaging plane, f is an overall focal length of the optical imaging system, Nd2 is a refractive index of the second lens, and Nd3 is a refractive index of the third lens.

2. The optical imaging system of claim 1, wherein the third lens comprises positive refractive power.

3. The optical imaging system of claim 1, wherein the fifth lens comprises negative refractive power.

4. The optical imaging system of claim 1, wherein the sixth lens comprises negative refractive power.

5. The optical imaging system of claim 1, wherein an object-side surface of the fourth lens is concave.

6. The optical imaging system of claim 1, wherein an image-side surface of the fourth lens is convex.

7. The optical imaging system of claim 1, wherein an object-side surface of the fifth lens is concave.

8. The optical imaging system of claim 1, wherein an image-side surface of the fifth lens is convex.

9. The optical imaging system of claim 1, wherein an object-side surface of the sixth lens is convex.

10. The optical imaging system of claim 1, wherein $0.5 < f1/f < 1.0$ in which f1 is a focal length of the first lens.

11. An optical imaging system comprising:
a first lens, a second lens, a third lens, a fourth lens, a fifth lens, and a sixth lens sequentially arranged on an optical axis from an object side to an image side,
wherein the third lens comprises positive refractive power, and an image-side surface of the sixth lens is concave, and
$0.7 < TL/f < 1.0$ and $|Nd2-Nd3| < 0.2$ in which TL is a distance from an object-side surface of the first lens to an imaging plane, f is an overall focal length of the optical imaging system, Nd2 is a refractive index of the second lens, and Nd3 is a refractive index of the third lens.

12. The optical imaging system of claim 11, wherein $-2.0 < f2/f < -1.0$ in which f2 is a focal length of the second lens.

13. The optical imaging system of claim 11, wherein $2.0 < f4/f < 3.6$ in which f4 is a focal length of the fourth lens.

14. The optical imaging system of claim 11, wherein $-4.0 < f5/f < -1.0$ in which f5 is a focal length of the fifth lens.

15. The optical imaging system of claim 11, wherein $-4.0 < f6/f < -1.0$ in which f6 is a focal length of the sixth lens.

16. The optical imaging system of claim 11, wherein $-2.0 < f4/f5 < -1.0$ in which f4 is a focal length of the fourth lens, and f5 is a focal length of the fifth lens.

17. A mobile communications terminal comprising:
a first optical imaging system comprising a first field of view and at least four lens; and
a second optical imaging system comprising a first lens, a second lens, a third lens, a fourth lens, a fifth lens, and a sixth lens, the second optical imaging system comprising a second field of view different from the first field of view;
wherein for the second optical imaging system, $0.7 < TL/f < 1.0$ and $|Nd2-Nd3| < 0.2$ in which TL is a distance from an object-side surface of the first lens to an imaging plane, f is an overall focal length of the second optical imaging system, Nd2 is a refractive index of the second lens, and Nd3 is a refractive index of the third lens.

18. The mobile communications terminal of claim 17, wherein the first lens and the sixth lens of the second optical imaging system each comprise a concave image side surface and negative refractive power.

19. The mobile communications terminal of claim 17, wherein the first field of view is 50% or more and the second field of view is 50% or less.

* * * * *